Aug. 14, 1962   D. A. GARRETT   3,049,186
ARTICULATING-FRAME LOGGING TRACTOR
Filed March 8, 1960   4 Sheets-Sheet 1

INVENTOR.
DWIGHT A GARRETT
BY
ATTORNEYS

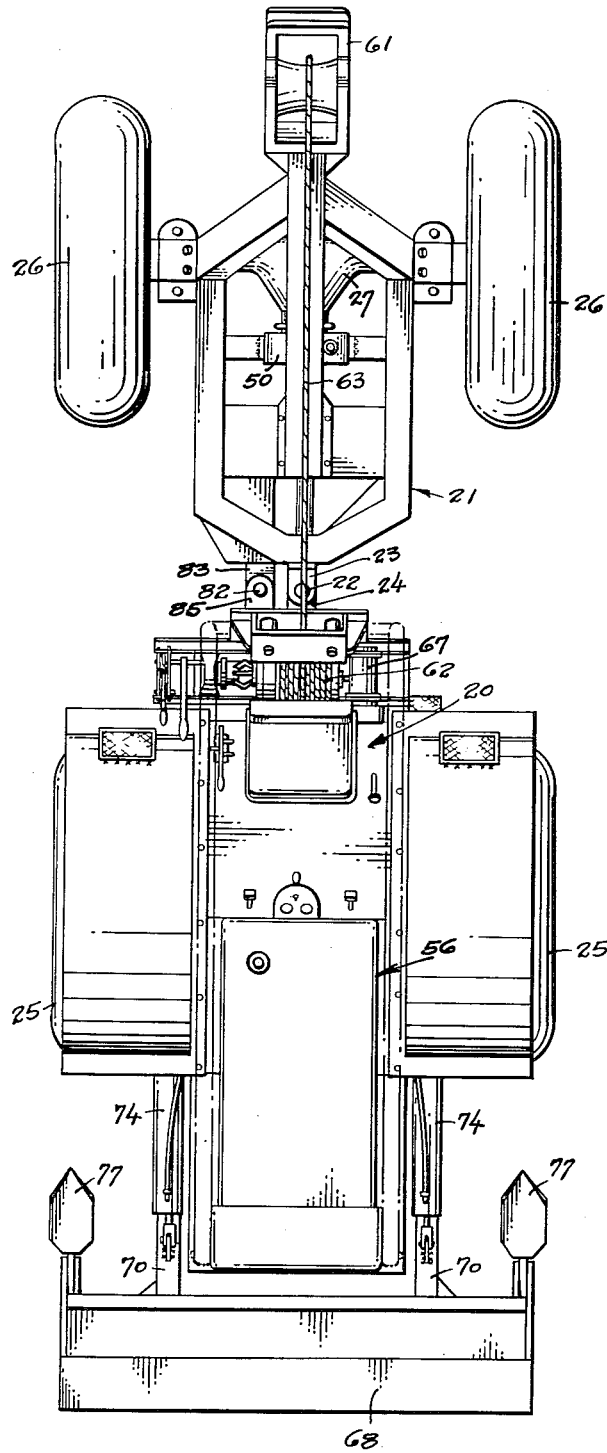
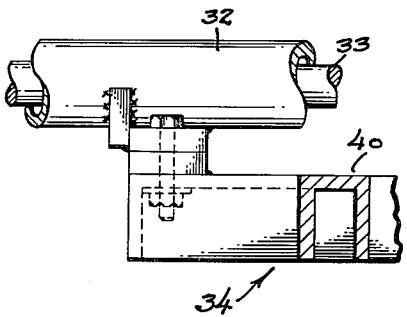
FIG. 2
FIG. 4
INVENTOR.
DWIGHT A. GARRETT
ATTORNEYS

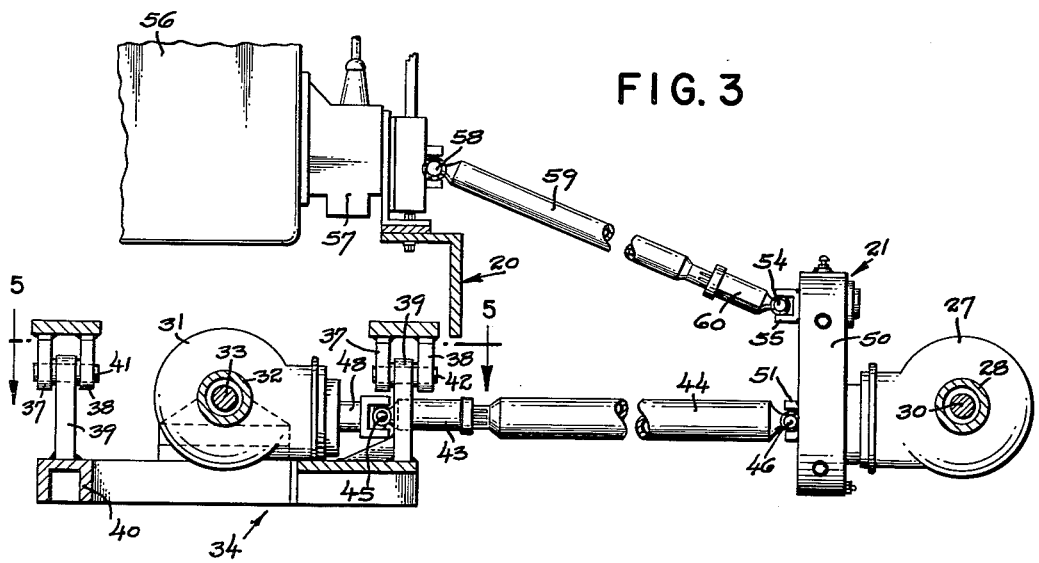
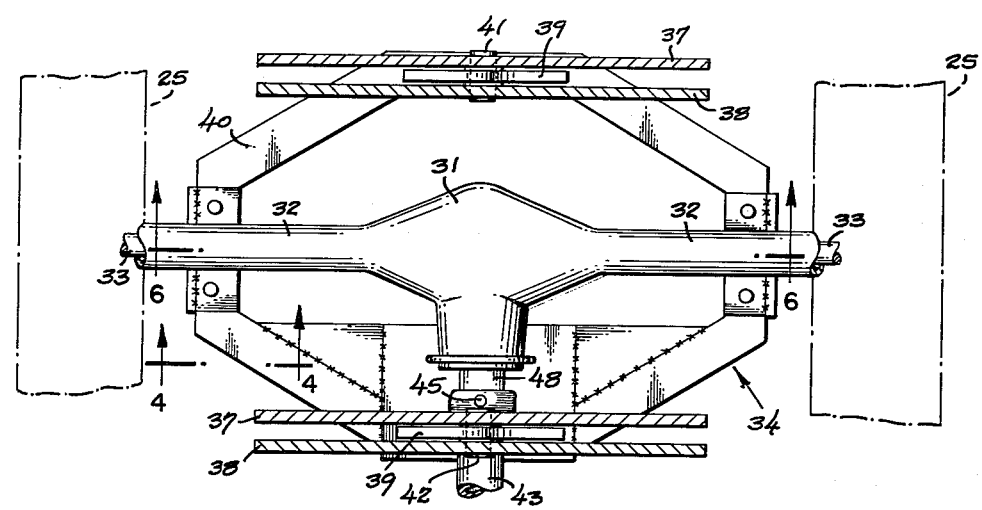
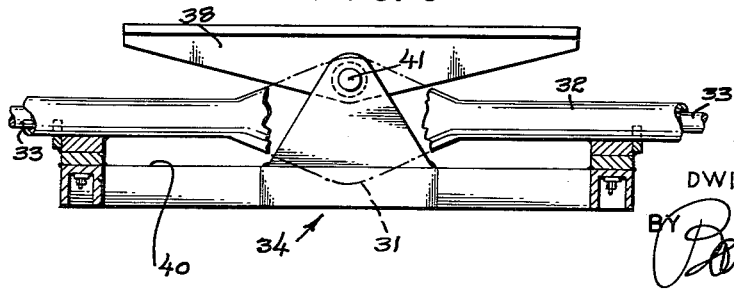

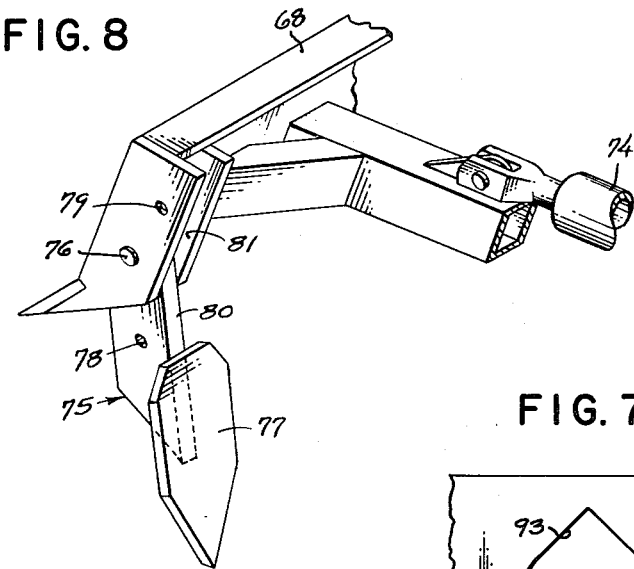
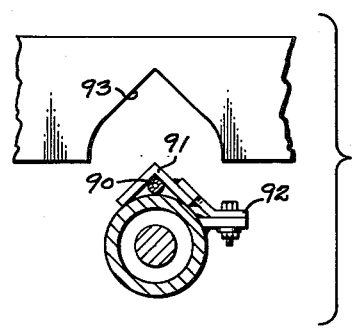
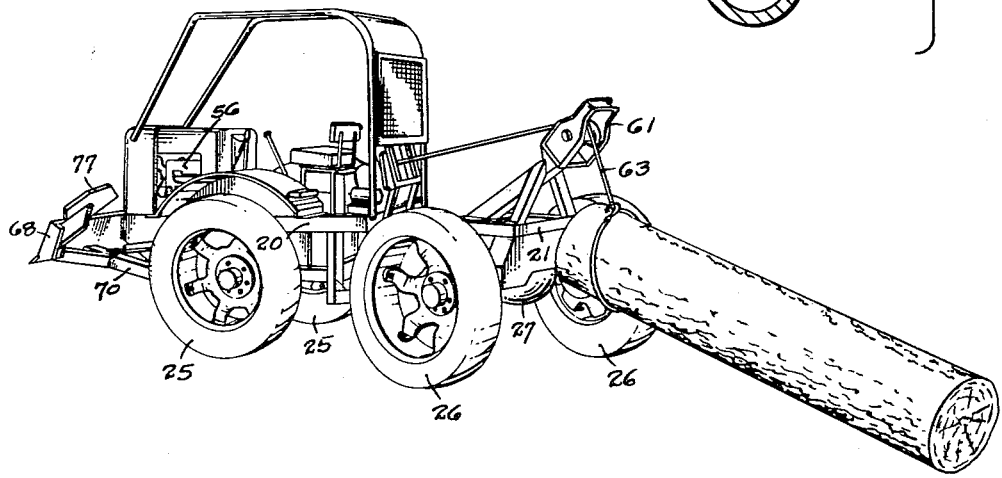
INVENTOR.
DWIGHT A. GARRETT
ATTORNEYS

United States Patent Office 3,049,186
Patented Aug. 14, 1962

3,049,186
ARTICULATING-FRAME LOGGING TRACTOR
Dwight A. Garrett, 711 Highway 410, Enumclaw, Wash.
Filed Mar. 8, 1960, Ser. No. 13,580
4 Claims. (Cl. 180—51)

This invention relates to tractors, and particularly wheeled tractors of the type in which all four wheels are driven and which employs an articulated frame so that a 2-wheeled front section thereof swivels in relation to a 2-wheeled rear section about a vertical axis placed more or less centrally to the length of the tractor, this swivel movement providing steering control for the tractor so that the vehicle has an unusually short turning radius and assured tractive power to each of the four wheels while turns are being negotiated.

As one particular object the invention aims to provide a tractor of the described character in which the front and rear frame sections are maintained in the same horizontal plane and yet the front and rear axles are free at all times to oscillate one in relation to the other, such end being attained by fixing one of the two axles to a cradle mounted for rocker motion relative to the other frame section about a horizontal axis located on the longitudinal median line of the latter frame section.

The invention has the further particular object of providing a tractor of the described nature in which the engine is mounted on the frame section from which the cradle is suspended, occupying a level above that occupied by the axles, and passes its drive by a torque shaft to an input shaft fixedly associated, axially speaking, with a transfer case fixedly associated with the differential for the axle of the other frame section, the drive being passed from said transfer case to input shafts associated with the differentials for the two axles.

It is a yet further object of the invention to provide a tractor of the described nature having an arch surmounting the rear frame section, thus particularly adapting the tractor for use in logging where logs are to be gathered in the woods and skidded to a loading yard, having a bulldozer blade upon its front end, and peculiarly characterized in that accessory claws are provided upon the bulldozer blade enabling such claws to take a firm ground purchase and hold the tractor stationary when pulling logs to the arch during a log-gathering operation.

With the above objects and advantages in view and otherwise looking to the improvement of a tractor of the described articulated-frame nature, the invention consists in the novel construction and in the adaptation and combination of parts hereinafter described and claimed.

In the accompanying drawings:

FIG. 2 is a top plan view of said tractor.

FIG. 3 is a fragmentary somewhat schematic longitudinal vertical section view drawn to an enlarged scale on a line to the near side of the transfer case.

FIG. 4 is a fragmentary transverse vertical sectional view drawn to a yet larger scale on line 4—4 of FIG. 5.

FIG. 5 is a fragmentary horizontal sectional view on line 5—5 of FIG. 3.

FIG. 6 is a fragmentary transverse vertical sectional view on line 6—6 of FIG. 5.

FIG. 7 is a fragmentary longitudinal vertical sectional view detailing a guard for the hydraulic lines which lead to the brakes of the front wheels. Guards for this purpose are provided for each of the front wheels as well as the rear wheels but for simplicity of illustration are deleted from the preceding views of the drawings.

FIG. 8 is a fragmentary perspective view illustrating the dozer blade with its accessory claws; and FIG. 9 is a perspective view of the tractor and showing a log supported thereby in position for skidding the same.

Figure 1:
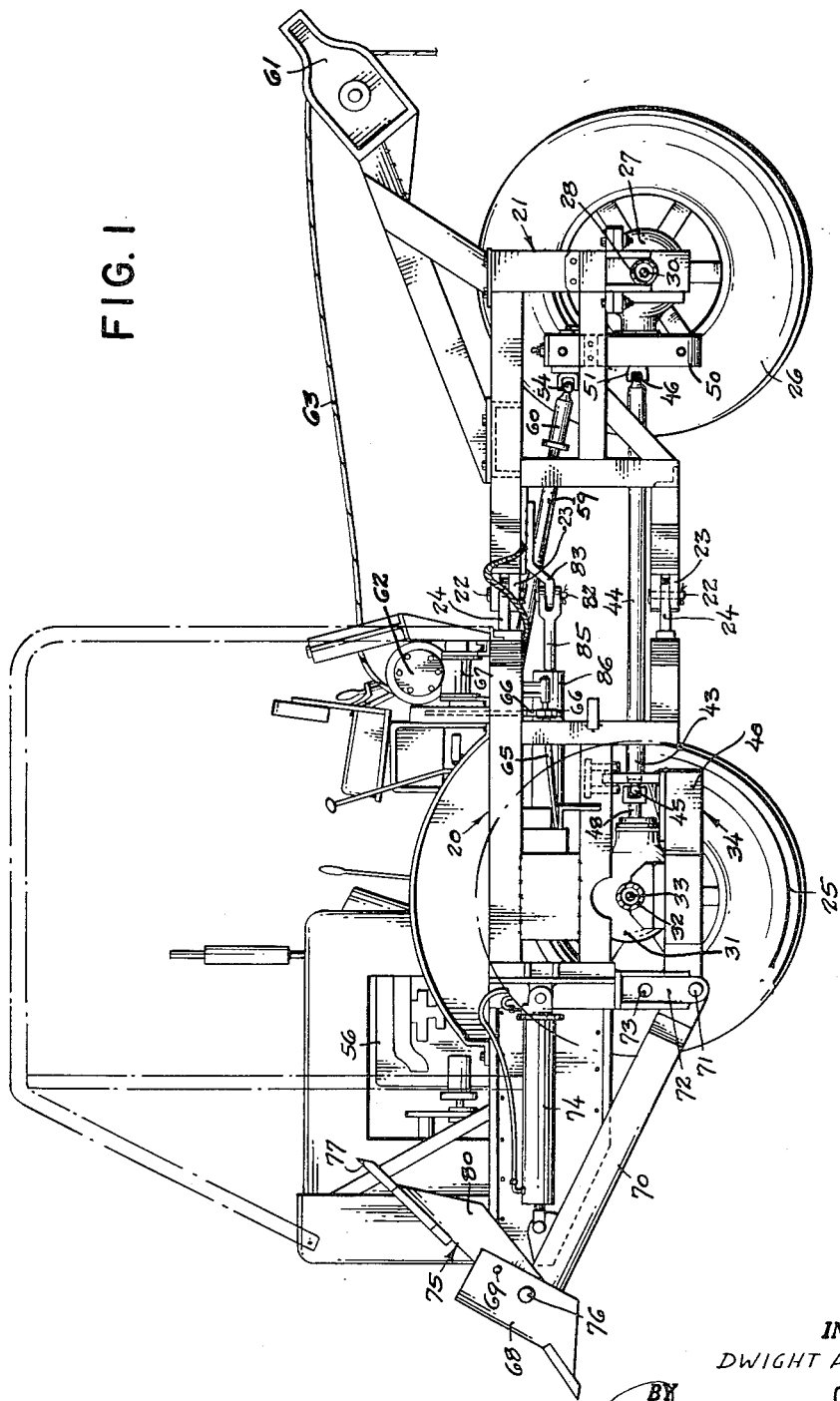
FIGURE 1 is a longitudinal vertical sectional view portraying a tractor constructed to embody the preferred teachings of the present invention, the section line being immediately to the inside of the near wheels. A driver's canopy is shown by broken lines, and a cable is portrayed fragmentarily running from an engine-driven winch over the arch.

The tractor of the present invention is essentially one having an articulated frame comprised of front and rear 2-wheeled sections pivotally connected so as to swing one in relation to the other about a vertical axis. Each of said frame sections is a rigid structure and is or may be fabricated from channel, plate and angle stock integrally connected by weld joints. Referring to the drawings, the front frame section is designated by 20 and the rear frame section by 21. The articulation between these sections is provided by two vertically spaced co-axial pivot assemblies each comprising a king-pin 22 connecting fork-arms 23 to a tongue 24 received therebetween, the fork-arms being extended forwardly as a rigid prolongation of the rear frame section while the tongues extend rearwardly as a rigid prolongation of the front frame section. Said pivot assemblies are rather widely spaced and desirably are located one somewhat below and the other well above a horizontal plane common to differentials through which drives are passed to respective live axles for the front wheels 25 and for the rear wheels 26 of the tractor. The differential 27 for the rear wheels and the housing 28 for the associated live axle 30 are rigidly secured to the rear frame section 21.

The differential for the front wheels is designated by 31. Such differential, together with the housing 32 for the live axle 33, is rigidly carried by a cradle 34 which underlies the front frame section 20 and is pivoted thereto for rocker motion about a horizontal axis lying on the longitudinal median line of the front frame section.

To produce this rocker mounting, connections are provided fore and aft of the differential. Detailed in FIG. 5, the connections are each one in which a pivot pin traverses a pair of spaced-apart plates 37—38 rigid with and depending from the frame section, and an upstanding ear 39 rising from the bed 40 of the cradle into the interstice between said plates. The fore and aft pivot pins are denoted 41 and 42, respectively. The ear 39 for such aft rocker connection has an opening therein through which the forward end of a horizontally disposed telescoping lower-level torque shaft freely extends. Comprised of spline-connected sections 43—44, said torque shaft has its two ends both connected by universals, as 45 and 46, one with a rearwardly pointing stubbed input shaft 48 for the front differential 31, and the other with a stubbed output shaft 51 pointing forwardly from a transfer case 50 located to the front of the rear differential 27 and made rigid therewith. Within the transfer case said output shaft 51 is fixedly attached to a co-axially disposed forwardly pointing input shaft for such rear differential 27.

The power-plant 56 for the tractor is mounted upon the front frame section of the tractor and has both a main and an auxiliary drive. The main drive passes through a transmission 57 to a rearwardly pointing horizontally disposed stubbed output shaft having its axis spaced above the axis of the stub shaft 48. The aft end of this main drive shaft connects by a universal 58 with a telescoping upper-lever torque shaft leading diagonally downwardly to and connecting by a universal joint 54 with a forwardly pointing input shaft 55 for the transfer case 50. Like the lower-level torque shaft, such upper-level torque shaft is comprised of spline-connected sections 59 and 60.

The rear frame section 21 is rigidly surmounted by an arch 61. The front frame section carries a winch 62 on the drum of which the line 63 for the arch is wound. The drive for the winch (see FIG. 1) is taken off the engine's auxiliary drive, being carried to a jack-shaft 65 and thence by chain 66 to worm and worm-wheel reduction gears of a gear box 67.

The front frame section 20 carries upon its front end a dozer blade 68 secured to side arms 70 pivoted at 71 to leg dependencies 72 provided at each side of the frame section, said pivot pins being selectively applied to either of two vertically spaced holes 73. The dozer blade is raised and lowered in the customary manner by hydraulic ram-cylinder assemblies 74 extending between the frame and the free end of a related side arm 70 at each side of the tractor. In addition to its ordinary function the dozer blade of the present invention is made to function as a ground anchor localizing the tractor against movement while a log is being drawn to the arch by the winch 62. To this end a respective claw 75 is pivoted as at 76 to each of the two sides of the dozer blade for vertical swing movement about a transverse horizontal axis. A flat-faced ground-engaging share 77 is provided upon the free end of each claw. A removable pin 69 engages in registering holes 78—79 of the claw and the blade to normally hold the claw in an elevated inoperative position. It will be understood, when the claws are lowered, that butt surfaces (not shown) of the claw-legs 80 bottom against the back wall of slots 81 in which said legs are received.

For steering purposes, the rear frame section has a rigid arm 83 extending forwardly therefrom. The free end of this arm lies to one side of the tractor's axis of articulation, and connects by a pivot pin 82 with the piston rod 85 of a hydraulic cylinder 86 which is in turn pivotally rooted to the front frame section. The hydraulic system for controlling said steering rod 85 and for controlling the movement of the dozer blade includes the usual pump supplying fuel under pressure from a storage tank to suitable control valves. These and other controls for the operation of the tractor and its winch are or may be of the usual construction manipulated in the usual or a suitable manner.

Express mention, as regards vehicle braking, is made to respective hydraulic lines 90 (FIG. 7) which lead to brakes for each of the four wheels of the tractor. All such lines pass outwardly to the brake structure along the exterior surface of the concerned axle housing 28 or 32, as the case may be, and is guarded in each instance by an overlying plate, as 91, having an ear or ears 92 thereon by which it is boltably secured to the housing. In the instance of the front frame section, cut-outs 93 are provided in overlying side stringers of the frame to accommodate the axle housing and its said guard plate as the cradle rocks relative to said frame.

It will be understood that a chain-and-sprocket connection, or its functional counterpart in a gear train, is housed within the transfer case and drops the drive from the input shaft 55 to the output shaft 51.

It is believed that the invention and the manner of its operation will have been clearly understood from the foregoing detailed description of the now-preferred illustrated embodiment. Changes in details of construction can be resorted to without departing from the spirit of the invention and it is accordingly my intention that no limitations be implied and that the hereto annexed claims be given the broadest interpretation to which the employed language fairly admits.

What I claim is:

1. A vehicle comprising front and rear 2-wheeled frame sections articulating for swing motion, one in relation to the other, about a vertical axis occupying the longitudinal median line of both sections, and having an engine, engine-driven speed-change mechanism, a driver's station, and all vehicle controls supported by the front section, a rearwardly pointing main power output shaft from said speed-change mechanism, a cradle underlying and giving support to the front section and mounted for rocker motion relative thereto about a horizontal axis extending on the longitudinal median line of the section, means for swinging said sections one relative to the other about said axis of articulation for steering the vehicle, a live axle carried by the cradle to occupy a transverse horizontal axis fixedly related to the cradle, a differential for said axle having an input shaft, a live axle carried by the rear frame section to occupy a transverse horizontal axis, a differential for said last-named axle having an input shaft, both of said input shafts pointing inwardly toward one another on horizontal axes which generally coincide when the two sections are in a normal centered condition and which occupy a generally horizontal plane spaced below the horizontal plane occupied by said main power output shaft of the speed-change mechanism, a torque shaft connecting the two input shafts, and a transfer mechanism housed in a case rigidly supported by the rear frame section driven from said main power output shaft by a torque shaft and passing the drive to one of said input shafts, said torque shafts being each comprised of telescoping splined sections fitted at each of the two ends with a respective universal joint.

2. Structure according to claim 1, both of the torque shafts having an extended length, rigid upper and lower rearwardly extending prolongations of the front frame section acting in complement with meeting rigid forwardly extending upper and lower prolongations of the rear frame section to receive co-axial pivot pins producing the articulation between the frame sections, said upper and lower sets of meeting frame prolongations lying the former above the upper torque shaft and the latter below the lower torque shaft and serving to guard the same.

3. A vehicle comprising front and rear frame sections articulating for swing motion, one in relation to the other, in a common horizontal plane about a vertical axis, and having an internal combustion engine and an engine-driven transmission supported by the front section, said transmission providing a rearwardly pointing main power output shaft, a cradle underlying and giving support to said front section and mounted for rocker motion relative thereto about a horizontal axis extending longitudinally of the section, means for swinging said rear frame section relative to the front frame section about said axis of articulation for steering the vehicle, a set of two ground wheels carried by the cradle one at each of the two sides of the cradle, a set of two ground wheels carried by the rear frame section one at each of the two sides of the rear frame section, respective live axles for each of said sets of ground wheels, respective differentials for said front and rear axles having driving connection therewith and presenting, respectively, a rearwardly pointing and a forwardly pointing input shaft, a transfer case carried by the rear frame section located to the front of said rear differential and having a forwardly pointing upper level input shaft and both forwardly and rearwardly pointing lower level output shafts, said transfer case being rigid with the housing for said rear differential and passing the drive from its input shaft to said output shafts at a fixed speed ratio, said rearwardly pointing output shaft of the transfer case connecting directly with the input shaft of said rear differential, a torque-rod comprising spline-connected sections connecting by a respective universal fore and aft of said axis of articulation with the forwardly pointing output shaft of the transfer case and the input shaft of the front differential, and a torque-rod comprising spline-connected sections connecting by a respective universal fore and aft of said axis of articulation with said main power output shaft and with the input shaft of the transfer case.

4. A vehicle comprising two 2-wheeled frame sections, one a rocking section and the other a non-rocking section, articulating for swing motion, one in relation to the other, about a vertical axis occupying the longitudinal median line of both sections, and having an engine, engine-driven speed-change mechanism, a driver's station, and all vehicle controls supported by the rocking section, a main power output shaft from said speed-change mechanism pointing inwardly toward the axis of articulation, a cradle underlying and giving support to said rocking section and mounted for rocker motion relative thereto about a horizontal axis extending on the longitudinal median line of the section, means for swinging said sections one relative to the other about said axis of articulation for steering the vehicle, a live axle for the two wheels of the rocking section carried by the cradle to occupy a transverse horizontal axis fixedly related to the cradle, a differential for said axle of the rocking section having an input shaft, a live axle for the two wheels of the non-rocking section carried by said non-rocking section to occupy a transverse horizontal axis fixedly related to such non-rocking section, a differential for said axle of the non-rocking section having an input shaft, both of said input shafts pointing inwardly toward the axis of articulation, a transfer mechanism housed in a case rigidly supported by the non-rocking frame section in a position between the related differential and the axis of articulation and having both inwardly and outwardly pointing lower level output shafts and an upper level input shaft pointing inwardly toward the axis of articulation, said outwardly pointing output shaft of the transfer mechanism connecting with the input shaft of said differential of the non-rocking frame section, a torque rod comprising spline-connected sections connecting by a respective universal fore and aft of said axis of articulation with the input shaft of the differential of the rocking section and with the inwardly pointing output shaft of the transfer mechanism, and a torque rod comprising spline-connected sections connecting by a respective universal fore and aft of said axis of articulation with said main power output shaft and with the input shaft of the transfer mechanism.

References Cited in the file of this patent
UNITED STATES PATENTS

| | | |
|---|---|---|
| 1,214,151 | Geer | Jan. 30, 1917 |
| 1,435,920 | Greenleaf | Nov. 21, 1922 |
| 1,506,653 | Meilike | Aug. 26, 1924 |
| 1,623,214 | Storey | Apr. 5, 1927 |
| 2,625,231 | Martin | Jan. 13, 1953 |
| 2,691,451 | Westfall | Oct. 12, 1954 |
| 2,700,833 | Small | Feb. 1, 1955 |
| 2,710,167 | Sandland | June 7, 1955 |
| 2,737,736 | Macdonald | Mar. 13, 1956 |
| 2,827,715 | Wagner | Mar. 25, 1958 |
| 2,884,083 | McColl | Apr. 28, 1959 |
| 2,885,799 | Le Tourneau | May 12, 1959 |